United States Patent
Lachapelle et al.

(10) Patent No.: US 8,935,613 B1
(45) Date of Patent: Jan. 13, 2015

(54) COMMUNICATION INITIATION CONTROL

(75) Inventors: Serge Lachapelle, Valentuna (SE); John E. Knapp, Seattle, WA (US); Rian Liebenberg, United Kingdom (GB)

(73) Assignee: Google Inc., Mountain View, CA (US)

( * ) Notice: Subject to any disclaimer, the term of this patent is extended or adjusted under 35 U.S.C. 154(b) by 703 days.

(21) Appl. No.: 12/914,749

(22) Filed: Oct. 28, 2010

(51) Int. Cl.
*G06F 3/00* (2006.01)
*G06F 7/00* (2006.01)

(52) U.S. Cl.
USPC ............ 715/738; 715/751; 707/723; 707/731

(58) Field of Classification Search
CPC ................ H04L 29/0809; G06F 17/30864
USPC ........................ 715/751, 738; 707/723, 731
See application file for complete search history.

(56) References Cited

U.S. PATENT DOCUMENTS

| | | | |
|---|---|---|---|
| 7,305,438 B2 | 12/2007 | Christensen et al. | |
| 7,305,546 B1 | 12/2007 | Miller | |
| 7,787,440 B1 | 8/2010 | Chaturvedi et al. | |
| 8,095,524 B2 | 1/2012 | Kandogan et al. | |
| 2002/0075304 A1 | 6/2002 | Thompson et al. | |
| 2004/0152477 A1 | 8/2004 | Wu et al. | |
| 2005/0041604 A1 | 2/2005 | Tighe et al. | |
| 2005/0041617 A1 | 2/2005 | Huotari et al. | |
| 2005/0071428 A1 | 3/2005 | Khakoo et al. | |
| 2005/0124363 A1 | 6/2005 | Klassen et al. | |
| 2005/0125541 A1 | 6/2005 | Frank et al. | |
| 2005/0165584 A1* | 7/2005 | Boody et al. ............... 702/186 |
| 2005/0165920 A1 | 7/2005 | Kerr et al. | |
| 2005/0204309 A1 | 9/2005 | Szeto | |
| 2006/0026256 A1 | 2/2006 | Diddee et al. | |
| 2006/0035632 A1 | 2/2006 | Sorvari et al. | |
| 2006/0047747 A1 | 3/2006 | Erickson et al. | |
| 2006/0053379 A1 | 3/2006 | Henderson et al. | |
| 2006/0059236 A1 | 3/2006 | Sheppard et al. | |
| 2006/0167991 A1 | 7/2006 | Heikes et al. | |
| 2006/0190525 A1 | 8/2006 | Bobde et al. | |
| 2006/0234723 A1 | 10/2006 | Pedersen | |
| 2006/0256816 A1 | 11/2006 | Yarlagadda et al. | |
| 2006/0280166 A1 | 12/2006 | Morris | |
| 2008/0045176 A1 | 2/2008 | Ho et al. | |
| 2008/0148154 A1* | 6/2008 | Burrell et al. ............... 715/733 |
| 2008/0219427 A1 | 9/2008 | Naono et al. | |
| 2008/0294772 A1 | 11/2008 | Hagale et al. | |

(Continued)

OTHER PUBLICATIONS

Office Action dated Nov. 28, 2011 for U.S. Appl. No. 13/249,296. 16 pages.

(Continued)

*Primary Examiner* — Tadeese Hailu
(74) *Attorney, Agent, or Firm* — Fish & Richardson P.C.

(57) ABSTRACT

Methods, systems, and apparatus, including computer programs encoded on a computer storage medium, for providing communication initiation controls. In one aspect, a method includes receiving a term that a user has entered into a text field, selecting one or more contacts that match the term, providing a communication initiation control for each of multiple communication modes, determining, for each of the multiple communication modes, whether any of the selected contacts are available or are capable of communicating through the communication mode, and enabling or disabling, for each of the multiple communication modes, the communication initiation control for the communication mode based on determining whether any of the selected contacts are available or are capable of communicating through the communication mode.

24 Claims, 6 Drawing Sheets

(56) References Cited

U.S. PATENT DOCUMENTS

| | | |
|---|---|---|
| 2008/0311883 A1 | 12/2008 | Bellora et al. |
| 2009/0030919 A1 | 1/2009 | Brezina et al. |
| 2009/0094341 A1 | 4/2009 | Szeto |
| 2009/0106676 A1 | 4/2009 | Brezina et al. |
| 2009/0274286 A1 | 11/2009 | O Shaughnessy et al. |
| 2009/0319941 A1* | 12/2009 | Laansoo et al. ............... 715/784 |
| 2009/0327501 A1 | 12/2009 | Athsani et al. |
| 2010/0189260 A1 | 7/2010 | Ramanathan et al. |
| 2010/0235761 A1* | 9/2010 | Blagsvedt et al. ............ 715/752 |
| 2010/0251124 A1 | 9/2010 | Geppert et al. |
| 2010/0296640 A1 | 11/2010 | Stucker et al. |
| 2011/0003585 A1 | 1/2011 | Wang et al. |
| 2011/0078184 A1* | 3/2011 | Song et al. .................... 707/770 |
| 2011/0087747 A1 | 4/2011 | Hirst et al. |
| 2011/0179126 A1 | 7/2011 | Wetherell et al. |

OTHER PUBLICATIONS

Office Action for U.S. Appl. No. 13/249,296 dated Mar. 20, 2012. 17 pages.

http://messenger.yahoo.com/; Yahoo! Messenger (pp. 1-28) dated Oct. 10, 2004.

* cited by examiner

COMMUNICATION INITIATION CONTROL

BACKGROUND

The present specification relates to communication initiation controls.

As devices have become more and more complex, many devices now include functionality enabling communication through multiple communication modes. For example, the owner of a smart phone can communicate with another party through e-mail, text messages via short message service (SMS), telephone communication, voice over Internet Protocol (VOIP), and perhaps other communication modes. Nevertheless, constraints on user interfaces can make accessing the communication functionality of a device difficult, confusing, or time consuming. In some cases, users may lack information that could enable them to successfully initiate communication through any one of multiple communication modes.

SUMMARY

According to one innovative aspect of the subject matter described in this specification, as the user types in, speaks, or otherwise enters information that may be used to identify a contact, the communication status of the contact is obtained, and information identifying the communication status is displayed to the user through an enhanced communication initiation control. The user may then interact with the control to select a particular user, as well as a particular communication mode through which communication with the particular user is to be initiated.

Another innovative aspect of the subject matter described in this specification is embodied in methods that include the actions of selecting one or more contacts, providing controls for initiating communication through each of multiple communication modes (such as phone, e-mail, and video conferencing), determining for each communication mode whether at least one selected contact is available or is capable of communicating through the communication mode, and enabling or disabling each control based on whether at least one selected contact is available or is capable of communicating through the communication mode associated with the control.

As used by this specification, a "communication mode" refers to a framework, approach, or channel of communication, including communication via telephone, e-mail, text message such as Short Message Service (SMS), video conferencing, online chat, fax, and other forms of communication. Communication modes themselves are distinguishable from the type of information exchanged (e.g., audio, text, video, etc.), and the technological protocols employed (e.g., messaging standards for e-mail and SMS messaging).

Furthermore, as used by this specification, the term "matching" refers to identifying values that have relationships with each other. Matching relationships can include equality, partial equality, topical relevance, proximity, and other types of relationships. A "contact" refers to a person, business, organization, or other entity or system with which the owner of a mobile device may wish to communicate, or to data that references a person, business, organization, or other entity or system.

In general, another aspect of the subject matter described in this specification may be embodied in methods that include the actions of receiving a term that a user has entered into a text field; selecting one or more contacts that match the term; providing a communication initiation control for each of multiple communication modes; determining, for each of the multiple communication modes, whether any of the selected contacts are available or are capable of communicating through the communication mode; and enabling or disabling, for each of the multiple communication modes, the communication initiation control for the communication mode based on determining whether any of the selected contacts are available or are capable of communicating through the communication mode.

Other embodiments of these aspects include corresponding systems, apparatus, and computer programs, configured to perform the actions of the methods, encoded on computer storage devices.

These and other embodiments may each optionally include one or more of the following features. For instance, enabling or disabling the communication initiation control includes enabling, for each of the multiple communication modes, the communication initiation control based on determining that any of the selected contacts are available or capable of communicating through the communication mode; enabling or disabling the communication initiation control includes disabling, for each of the multiple communication modes, the communication initiation control based on determining that none of the selected contacts are available or capable of communicating through the communication mode; providing a list identifying the one or more selected contacts; selecting the contacts includes executing a search query using the received term, and selecting, as the one or more contacts, the result of the search query; the one or more selected contacts include contacts selected from a contacts list; the one or more selected contacts include contacts selected from a list of social networking connections; the selected contacts include contacts selected from a private information source associated with the user, and contacts selected from a different, public information source; the first source includes a contacts list and the second source includes a web resource; determining, for each of the multiple communication modes, whether any of the selected contacts are available or are capable of communicating through the communication mode includes receiving information about a hardware capability of a client device associated with a selected contact or with the user; determining, for each of the multiple communication modes, whether any of the selected contacts are available or are capable of communicating through the communication mode includes receiving information about a network capability of a client device associated with a selected contact; determining, for each of the multiple communication modes, whether any of the selected contacts are available or are capable of communicating through the communication mode includes receiving information about a current schedule of a selected contact; determining, for each of the multiple communication modes, whether any of the selected contacts are available or are capable of communicating through the communication mode includes receiving information about a current location of a selected contact; determining a likelihood that the user will initiate communication, where providing a communication initiation control for each of multiple communication modes is based on determining a likelihood that the user will initiate communication; and/or providing a list with a plurality of entries, the entries including at least one of the selected contacts and a result from a search query that is not a contact, where determining a likelihood that the user will initiate communication comprises determining that the highest ranked entry is one of the selected contacts.

Advantageous implementations can include one or more of the following features. The user can initiate communication through one of multiple communication modes from a single user interface, thereby enhancing the overall user experience. The user can receive information indicating whether one or more contacts are available or are capable of communicating through one or more communication modes, thus facilitating the initiation of communication through the communication modes.

The details of one or more implementations are set forth in the accompanying drawings and the description below. Other features and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
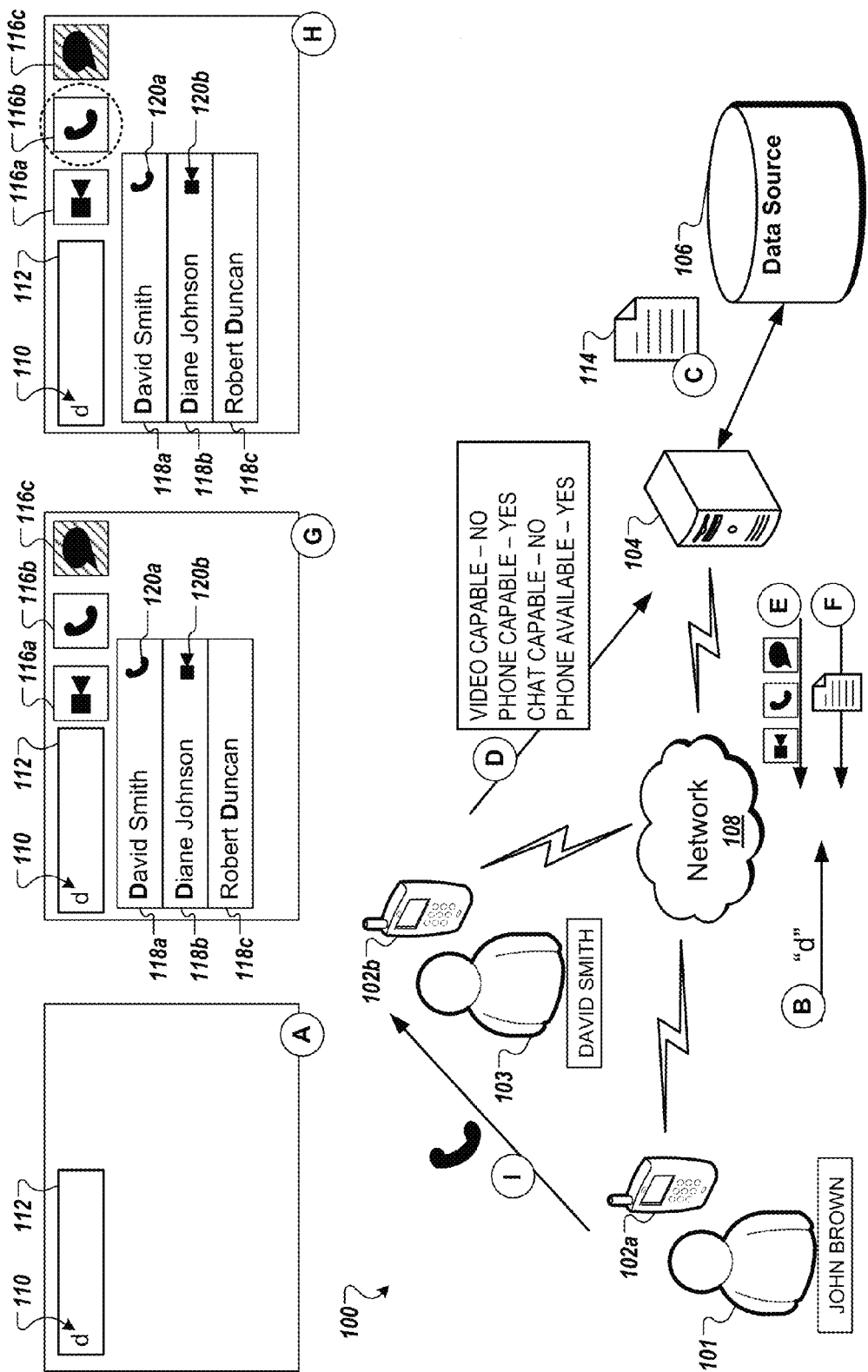
FIGS. 1 and 4 are diagrams illustrating examples of systems for providing communication initiation controls.

FIG. 1 is a diagram of an example of a system 100 for providing communication initiation controls. System 100 includes client devices 102a, 102b, a server 104, a data source 106, a network 108. FIG. 1 also illustrates a flow of data between the components of the system 100 during states (A) to (I), as well as user interfaces that are displayed on the client device 102a during states (A), (G), and (H). In practice, states (A) to (I) may occur in the illustrated time sequence, or they may occur in a sequence that is different than is illustrated.

To enable initiating communication through multiple communication modes, a device or server receives a term entered by a user in a text field, selects one or more contacts that match the term, and provides communication initiation controls for each of multiple communication modes (e.g., telephone, e-mail, video conferencing, etc.). The device or server determines whether any of the selected contacts are available or capable of communicating through each communication mode, and enables or disables each communication initiation control based on whether any of the selected contacts are available or are capable of communicating through the communication mode. Using the communication initiation controls, a user can easily initiate communication of various types from a single, compact user interface. Because the communication initiation controls are enabled or disabled based on the capability and availability of the selected contacts, the user can easily determine which forms of communication are available to reach the selected contacts.

Examples of client devices 102a, 102b include a phone, computer, or other device capable of initiating communication. Each client device 102a, 102b includes a display or other output module that presents a user interface to a respective user. Each client device 102a, 102b also includes one or more input modules that receives data and other selections from the respective user. The server 104 can include one or more server systems. The server 104 can be directly or indirectly linked to a data source 106. The data source 106 can include tables, databases, and other data storage elements.

The client devices 102a, 102b and server 104 are connected by the network 108, which can be a wired or wireless network. The network 108 can also connect the data source 106 to the server 104. The network 108 may include a packet based network, such as a TCP-IP network and may include a local area network, wide area network, or the Internet.

During state (A), the user 101 of the client device 102a enters a term 110 (in the illustration, "d") in a text field 112 on the user interface of the client device 102a. The term 110 is a value or expression including one or more characters or symbols, such as a string of one or more characters that form a word, multiple words, or a part of a word. The term 110 can include numbers, letters, punctuation, and symbols. The text field 112 can include a text box, text area, table, drop down list, editable label, or any other control or element in which the user 101 can enter the term 110.

During state (B), the client device 102a communicates the term 110 to the server 104. The term 110 may be automatically transmitted by the client device 102a automatically, without requiring any additional interaction from the user 101 to initiate the communication.

During state (C), the server 104 selects one or more contacts that match the term 110. The server 104 selects contacts based on information in a contacts list or other information source. For example, the server 104 may select contacts identified in a contacts list that have a name that begins with the term 110. For instance, the server 104 may compare the term 110 that the user 101 entered in the text field 112 to the names of contacts in the in a list of contacts of the user 101. The server 104 then selects the contacts that have a name that begins with the term 110 (the letter "d").

Examples of contacts lists include a personal address book, a list of contacts with whom the user has communicated, a list of social networking connections, and other collections of contact information. As another example, a contacts list can include contacts selected from a social graph that indicates connections or relationships among contacts and the user 101. The contacts list may also include a list of contacts associated with a specific application, website, or client device 102a, 102b. Moreover, the server 104 may generate a contacts list using data from phone call records, e-mails, and other communications. A contacts list can be shared by multiple users with a certain affiliation in common, such as a directory of employees at a particular company or of students at a certain school. The contacts list may be stored, for example, on the data storage 106.

The server 104 selects contacts that match the term 110 by comparing the term 110 to one or more contact identifiers retrieved from the contacts list. Examples of contact identifiers include a name, nickname, username, address, e-mail address, phone number, URL, and client device identifier.

A contact matches the term 110 when a contact identifier for the contact matches the term 110. For a given term 110, the server 104 can analyze multiple contact identifiers, comparing the term 110 to, for example, a name, phone number, email address, and chat username of the contacts in a contacts list. For example, for the term 110 of "d," the server 104 may select a first contact having a first name of "David" and a second contact having a last name of "Duncan." The server 104 may also select a third contact having an address of "Dartmouth Street" and a fourth contact having a chat user name of "djones33." The server 104 may select contacts based on multiple relationships across multiple contact identifiers.

Selected contacts can be stored in a selected contacts list 114. The selected contacts list can include any data structure that can include a collection of data, and may include, but is not required to include, sorted or prioritized data. In some implementations, the selected contacts list may be ranked so that the highest ranked contacts represent the best matches to the term 110. The selected contacts can be ranked based on the position or frequency of the term 110 in a contact identifier and other relationships between contact identifiers and the term 110. For example, a contact having a name that begins with the term 110 may be ranked above a contact having a name that merely includes the term 110 in the middle of the name. Other factors can influence the ranking of contacts, including, for example, whether a contact was recently contacted by the user 101 or whether a contact is included in a list of the most frequently contacted contacts.

During state (D), the server 104 determines the capability and/or availability of the selected contacts to communicate through each of multiple communication modes. A contact may be considered to be capable of communication through a particular communication mode when a client device associated with the contact includes functionality to communicate through that mode. For example, a contact may be capable of telephone communication when he is associated with a client device that includes functionality to make and receive telephone calls. A contact is available for communication through a particular communication mode when the contact has placed himself or a client device associated with the contact in a condition or state to engage in communication. For example, a contact may be available for communication by telephone when a client device with telephone functionality is in its standard operating state, but the contact may be unavailable for communication by telephone when a do-not-disturb setting is activated on the client device.

For instance, a contact 103 named "David Smith" may be one of the contacts selected from the contacts list of the user 101 during state (C). The client device 102b of contact 103 provides the server 104 with information indicating whether the contact 103 is capable of communicating through each of multiple communication modes and whether the contact 103 is available to communicate through each of the communication modes. Based on the information received from the client device 102b, the server 104 determines that the contact 103 is capable of receiving a phone call and that the contact 103 is available for communication by phone. The server 104 also determines that the contact 103 is not currently capable of video or chat communication.

Communication modes can include telephone, e-mail, text message (SMS), video conferencing, online chat, fax, and other forms of communication. Communication through different channels can represent different communication modes, even if the type of communication is similar. For example, in some implementations, communication via an office phone with a first phone number may be considered a different communication mode from communication via a cell phone with a second phone number.

The capability of a contact can be based on the functionality of one or more client devices 102b associated with the contact. For example, the contact 103 associated with the client device 102b may be considered capable of communicating through a communication mode when the client device 102b includes the functionality to communicate through that mode, for example, the hardware and software enabling the client device 102b to receive a connection. For instance, the contact 103 can be considered capable of communicating by telephone when the client device 102b includes telephone functionality. As another example, the contact 103 can be considered capable of communicating by video when the client device 102b includes a microphone and video camera. On the other hand, when no client device 102b associated with a contact 103 includes functionality to enable communication through a particular communication mode, it is most likely that the contact 103 has no way to communicate through that communication mode.

Availability indicates whether contacts have placed themselves or their client devices in a condition or state to engage in communication. A contact may be unavailable even though a client device associated with the contact includes the functionality to communicate through a communication mode. For example, even though a contact may carry a phone that is fully functional to send and receive phone calls, the contact may indicate unavailability by turning off the ringer of the phone or setting a do-not-disturb setting.

Availability may be indicated explicitly, for example, by a contact setting a status of "busy," "out of the office," or "do not disturb." Availability may also be inferred based on activity or inactivity on a communication channel or mode, user preferences, a location of a contact, and other factors. For example, a contact may indicate on a calendar that the contact will be in a meeting at scheduled time, and based on the calendar record, the server 104 may determine that the contact is unavailable during the scheduled time. For some communication modes, such as phone communication, the server 104 may determine that a contact is available unless information indicating otherwise has been received.

In some implementations, a single measure of availability may apply to all communication modes. For example, a "do-not-disturb" setting may apply to phone, video, and other communication modes. In other implementations, however, because a user may be available to communicate through one mode but not another, availability can be determined separately for multiple communication modes. For example, a contact may be available for communication by text message but not available for voice communication by telephone.

To determine the availability and capability of contacts, the server 104 may obtain and record information about contacts and associated client devices 102a, 102b. In one implementation, the server 104 may maintain a database of the current availability and capability of contacts in the data source 106. While client devices 102b are connected to the network 108, the client devices 102b may provide capability and availability updates to the server 104, either automatically or in response to a request from the server 104.

The server 104 may determine availability and capability based on information from a variety of sources. For example, the server 104 may determine the capability of a client device 102b using a device identifier or a software version code. In addition, the server 104 may access a contact's calendar, for example, to determine when the contact will be busy and thus unavailable to communicate through by phone, video, or other communication modes. Other contexts, such as device or user profiles, or real-time data such as the location or activity of the client device 102 may be used to determine availability and/or capability.

During state (E), the server 104 provides communication initiation controls 116a-116c to the client device 102a of the user 101, the client device 102a on which the term 110 was initially entered. The communication initiation controls 116a-116c may be provided as separate controls or as components of a single control that enables the user 101 to initiate communication through the various communication modes. In one implementation, each of the communication initiation controls 116a-116c is a component of a single communication initiation control that includes multiple buttons or components.

Each communication initiation control 116a-116c is associated with a different communication mode, and each communication initiation control 116a-116c can include a button, link, or other interactive element. For example, communication initiation control 116a corresponds to a video conferencing communication mode, communication initiation control 116b corresponds to telephone communication mode, and communication initiation control 116c corresponds to online chat communication mode. When a communication initiation control 116a-116c is enabled and provided on a user interface 107, selection by a user causes communication to be initiated through the communication mode associated with the selected communication initiation control 116a-116c. For example, selection of the communication initiation control 116b for telephone communication would cause the client device 102a to attempt to initiate a telephone call to the contact that most closely matches the term 110.

The communication initiation controls 116a-116c can be provided as code that causes the communication initiation controls 116a-116c to be displayed which when the code is executed, interpreted, or rendered on the client device 102a. Similarly, the communication initiation controls 116a-116c can be provided as information that indicates to the client device 102a that the communication initiation controls 116a-116c should be generated for or presented on the user interface 107.

In addition, the code or information the communication initiation controls 116a-116c may have been previously provided to the client device 102a, such as when the user interface 107 with the text field 112 was first loaded on the client device 102a. Based on a trigger, event, or condition, previously received code may used to provide the communication initiation controls 116a-116c on the user interface 107.

During state (F), the server 104 transmits a selected contacts list 114 containing information that identifies one or more selected contacts that match the term 110. The transmitted information can include one or more contact identifiers for each selected contact. The server 104 may transmit information that identifies some subset of the selected contacts, such as the top fifty highest ranked contacts or the contacts that match the term with a name rather than another contact identifier.

The server 104 also transmits information indicating the availability and/or capability of the selected contacts. In one implementation, the server can transmit the availability and capability of particular contacts for communication through particular communication modes. For example, information determined about the availability and capability of contact 103 during state (D) may be transmitted, and may indicate, for instance, that contact 103 is available and is capable of phone communication, but is not capable of communication by video or online chat. In another implementation, a measure of the overall availability and capability of the selected contacts can be transmitted, for instance whether at least one of the selected contacts is available and capable of communicating through a communication mode.

During state (G), the communication initiation controls 116a-116c are provided on the user interface 107. Each communication initiation control 116a-116c is enabled or disabled to indicate the availability and capability of the selected contacts through the associated communication mode. An enabled control appears visually to be active and causes an action to be performed when selected. A disabled control appears to be inactive and will not cause a communication action if selected.

A communication initiation control 116a-116c may be enabled when at least one of the selected contacts is available and is capable of communicating through a particular communication mode. For instance, as shown, selected contact "David Smith" is available and is capable of communication by telephone, so the communication initiation control 116b for telephone communication is enabled. A communication initiation control 116a-116c may be disabled when none of the selected contacts are available and capable of communicating through the communication mode. For instance, none of the selected contacts are available and capable of communication by online chat, so the communication initiation control 116c for online chat is disabled, as illustrated by diagonal lines through the control.

The communication initiation controls 116a-116c not only provide the user 101 controls to initiate communication through multiple communication modes, they also provide capability and availability status information to the user 101. By enabling and disabling communication initiation controls 116a-116c in this manner, the system 100 indicates to the user 101 the set of communication modes that are available for the set of contacts that match the current term 110. As the term 110 changes and the set of selected contacts changes, i.e., as the user 101 continues to type in the term 110, the communication initiation controls 116a-116c are enabled and disabled to reflect the availability and capability of the contacts that match the current term 110.

For instance, if the user 101 desires to communicate with the contact 103 named "David Smith," the user 101 may enter the term 110 of "d" as illustrated. Even though the system may not yet have enough information to identify the contact 103 as the one contact that the user 101 desires to communicate with, the enabled and disabled communication initiation controls 116a-116c provide to the user 101 an overall measure of the capability and availability of all selected contacts matching the term 110, including the contact 103. Even if no more information is entered in the text field, the user 101 can see from the disabled communication initiation control 116c that the contact 103 either is not capable of or is not available for communication by online chat. Similarly, if the user 101 had desired to communicate with a different contact named "Robert Duncan" instead of the contact 103, the disabled communication initiation control 116c still indicates to the user 101 that the contact "Robert Duncan" is not capable of or is not available for online chat. As a result, the communication initiation controls 116a-116c immediately provide useful information to the user 101, even before the term 110 is detailed enough to specify a single contact.

If the communication initiation controls were enabled and disabled based only on the highest ranked contact, the information could potentially be irrelevant to the user 101 if the user 101 desired to communicate with a different contact. In addition, the highest ranking contact may change with each character entered into the text field, which may cause the communication initiation controls 116a-116c to be enabled and disabled frequently in a manner that may be disorienting to a user 101. By enabling and disabling the communication initiation controls 116a-116c based on the capability and availability of multiple contacts, at least some information is likely to be useful to the user 101 at all times and the communication initiation controls 116a-116c can be disabled in a orderly manner as the set of selected contacts is narrowed toward a desired contact.

Enabled and disabled communication initiation controls 116a-116c can be visually distinguished to quickly convey information to a user 101. Communication initiation control 116a-116c in an enabled state may be shown like other active controls, while communication initiation control 116a-116c in a disabled state may be darkened, shaded, flattened, crossed with lines or other patterns, shown in dashed lines, or otherwise indicated to be disabled.

The communication initiation controls 116a-116c can be provided whether or not any selected contact is available and is capable of communicating through a particular communication mode. Disabled communication initiation controls 116a-116c on a user interface 107 convey useful information to the user 101 and provide a consistent look for the user interface 107.

To provided additional information to a user 101, information identifying the selected contacts may also be provided on the user interface 107. For example, a ranked list of selected contacts may be provided as contact entries 118a-118c. A contact entry 118a-118c may include one or more a contact identifiers, for example, a name, e-mail address, or phone number. In addition, a contact entry 118a-118c may include one or more status indicators 120a, 120b indicating communication modes for which a particular contact is available and is capable of communicating through.

During state (H), the user 101 selects the communication initiation control 116b corresponding to telephone communication. Based on the selection, the client device 102a determines that a telephone call should be made to the contact 103 named "David Smith," the highest ranked contact in the list of selected contacts (shown as the highest ranked contact of the contact entries 118a-118c).

If the highest ranked contact is not available or is not capable of communication through the communication mode associated with the communication initiation control 116a-116c that the user 101 selects, the user 101 can be offered the option to initiate communication through an alternate communication mode. For example, the user 101 may select the communication initiation control 116a for video communication when the highest ranked contact is not capable of video communication. When the highest ranked contact is available and is capable of communicating by telephone, the user 101 can be offered the option to communicate with the highest ranked contact by telephone. As another example, if the e-mail address of the highest ranked contact is known, the user 101 can be presented the option to communicate by e-mail when the highest-ranking contact is not available or is not capable of communication through a selected communication mode.

The user 101 can also be presented the option to add information to enable communication. For example, if the user 101 selects the communication initiation control 116b for telephone communication and the highest-ranking contact's phone number is not known, the option for the user 101 to enter the highest-ranking contact's phone number can be presented on the user interface. Additionally, or alternatively, the option of using a search service to find the highest-ranking contact's phone number can be presented to the user 101.

During state (I), the client device 102a of user 101 initiates a telephone call to the client device 102b of the contact 103. The client device 102a can initiate communication by accessing hardware functionality of the client device 102a, executing code, loading an application, or other actions. Information necessary to initiate communication (such as a contact name or phone number), may be accessed from a contacts list, from the selected contacts list 114 received from the server 104, from directories, and from other sources.

Many actions described above may be performed on a client device 102a instead of a server 104. For example, the client device 102a on which the term 110 is entered may select contacts that match the term 110 and provide communication initiation controls 116a-116c for each of multiple communication modes. The client device 102a, may determine whether any of the selected contacts are available and are capable for communication through the various communication modes using information received from the server 104 or another system. The client device 102a may also enable and disable the communication initiation controls 116a-116c based on the availability and capability determinations, independent of the server 104.

Figure 2:
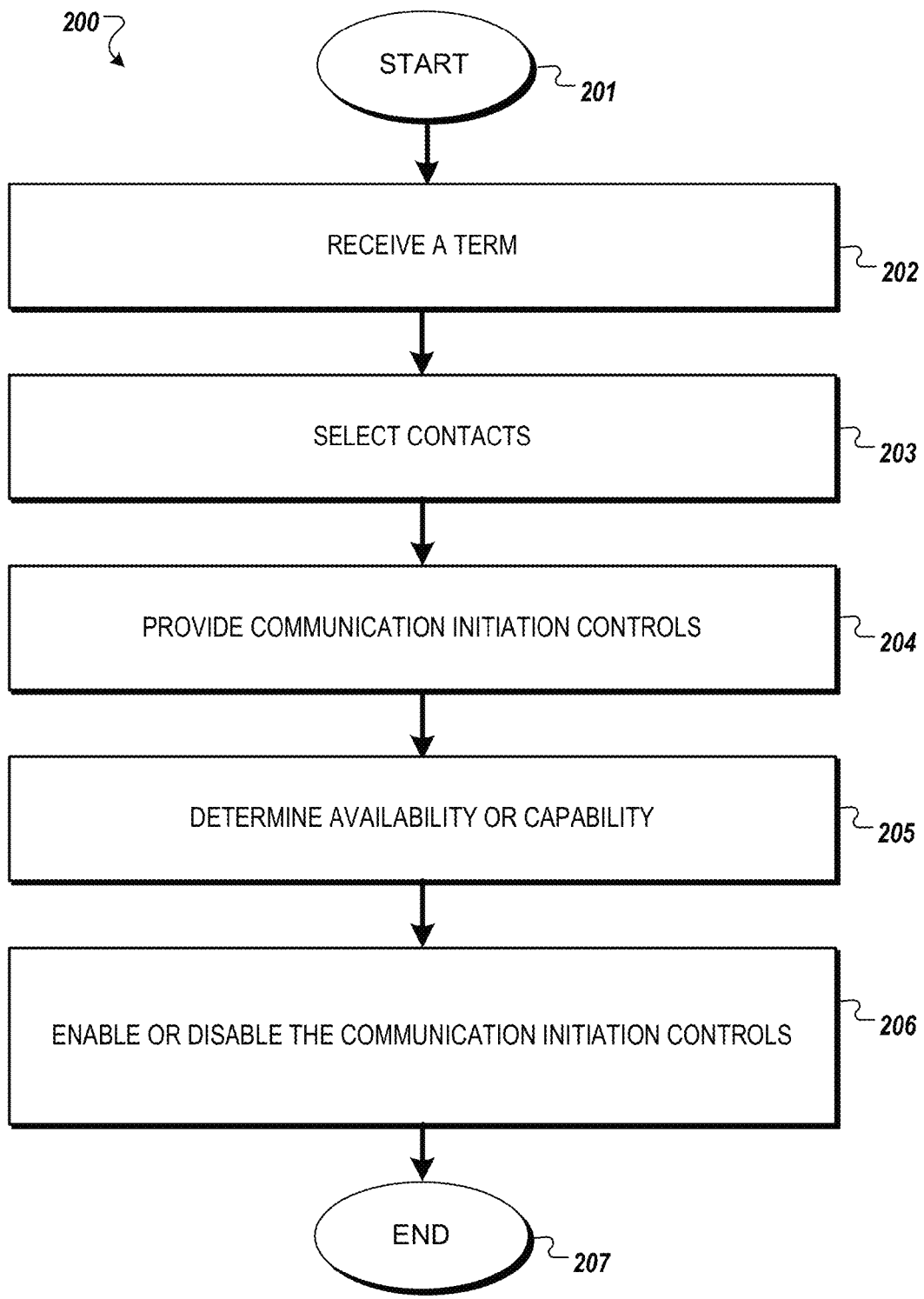
FIGS. 2 and 3 are flow charts illustrating example processes for providing communication initiation controls.

FIG. 2 is a flow chart illustrating an example of a process 200 for providing communication initiation controls. Briefly, the process 200 includes receiving a term that a user has entered into a text field, selecting one or more contacts that match the term, providing a communication initiation control for each of multiple communication modes, determining—for each of the multiple communication modes—whether any of the selected contacts are available or are capable of communicating through the communication mode, and enabling or disabling—for each of the multiple communication modes—the communication initiation control for the communication mode based on determining whether any of the selected contacts are available or are capable of communicating through the communication mode.

In further detail, when the process 200 begins (201), a term that a user has entered into a text field is received (202). The text field can be, for example, an element of a web page rendered on a client device. The text field can also be an element of an application, operating system, or other executable having a user interface on the client device.

One or more contacts matching the term are selected (203). Contacts may be selected from a contacts list, for example. A contacts list may be a private information source that is associated with a particular user. Contacts may also be selected from a list of social networking connections of a user. In addition, contacts may be selected from other sources, including public information sources such as directories, indexes, web resources, and other sources.

In some implementations, contacts may be selected from both a private information source associated and a public information source. Selected contacts may include contacts selected from a private information source associated with a user and contacts selected from a different, public information source. For example, selected contacts may include contacts from a user's personal contacts list and also contacts from a public directory. Contacts may also be selected from web resources, indexes, the results of search queries, and other sources of information. For example, selecting contacts can include executing a search query using the received term and selecting, as the one or more contacts, the result of the search query.

Selecting contacts can include comparing the term with one or more contact identifiers (for example, an address, telephone number, or name). For instance, a contact may be selected when the contact's name begins with the term or otherwise matches the term. A contact can match a term based on other relationships, including when a contact identifier includes, partially includes, ends with, or is otherwise related to the term. A contact identifier can be unique to a contact, but is not required to be unique.

A communication initiation control for each of multiple communication modes is provided (204). As described above, each communication initiation control may correspond with a particular communication mode. The communication initiation controls can be provided on a user interface and may be located near the text field.

For each of the multiple communication modes, it is determined whether any of the selected contacts are available or are capable of communicating through the communication mode (205). Because the availability and capability of the selected contacts can change over time, updated information about the selected contacts may be received to determine availability and capability at a specific time.

Determining whether a selected contact is available and is capable of communicating through a communication mode can include determining a hardware capability of a device associated with a selected contact or with the user. For example, determining the capability of a selected contact for video communication may include receiving information that indicates whether or not a device associated with the selected contact includes a camera. A device may be associated with a contact for a short duration, such as for a period of time that a user is signed into a web service. A device may also be associated with a user for an extended duration, such as the association of a phone with a particular phone number and contact.

Determining availability and capability can also include receiving information about other capabilities and attributes. Examples include a network capability, user preference, schedule, calendar, do-not-disturb setting, or location of a selected contact or the user. For example, information about selected contact's calendar may be received to determine whether the selected contact is busy and thus not available to communicate.

For each of the multiple communication modes, the communication initiation control for the communication mode is enabled or disabled based on determining whether any of the selected contacts are available of communicating through the communication mode (206), thus ending the process 200 (207).

In particular, enabling communication initiation controls can include enabling, for each of the multiple communication modes, the communication initiation control based on determining that any of the selected contacts are available or capable of communicating through the communication mode. Enabling may also be based on both capability and availability, such as enabling a communication initiation control when at least one selected contact is available or capable to communication through the communication mode. Disabling can include disabling, for each of the multiple communication modes, the communication initiation control based on determining that none of the selected contacts are available or are capable of communicating through the communication mode.

The process 200 can also include providing a list identifying the one or more selected contacts. The list may be ranked so that a user can identify which contacts best match the term. Contacts may be ranked according to the contact identifiers that match the term. For example, selected contacts may be ranked alphabetically by the names that match the term.

The process 200 can also include determining a likelihood that the user will initiate communication. Providing a communication initiation control for each of multiple communication modes can be based on determining a likelihood that user will initiate communication. For example, in some implementations, the process 200 can include providing a list with a plurality of entries, in which the entries include at least one of the selected contacts and a result from a search query that is not a contact. Determining a likelihood that a user will initiate communication can include determining whether the highest ranked entry in the list is a contact.

Figure 3:
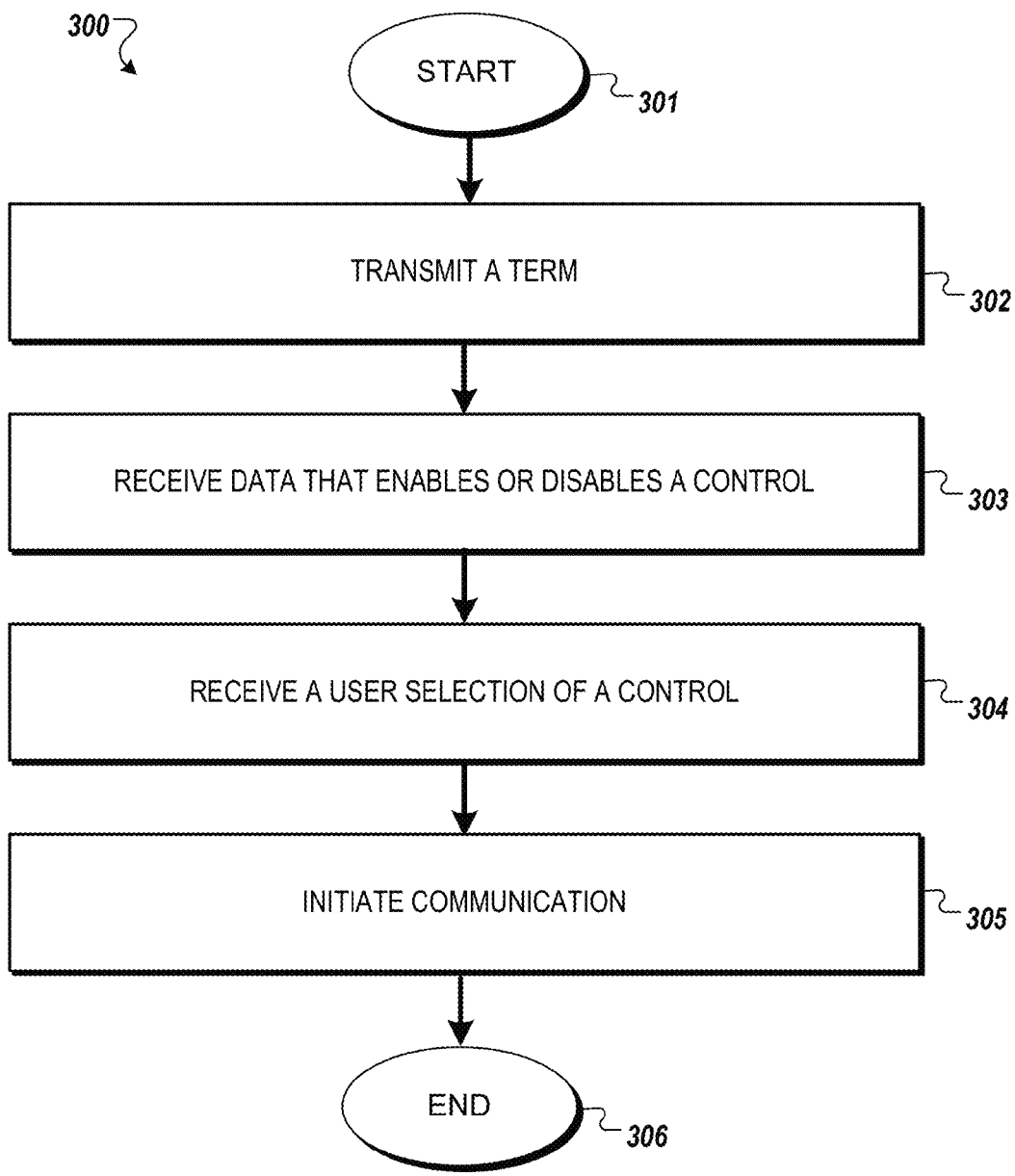

FIG. 3 is another flow chart illustrating an example of a process 300 for providing communication initiation controls. Briefly, the process includes transmitting a term that a user has entered into a text field, receiving, for each of multiple communication modes, a communication initiation control and data that enables or disables the communication initiation control, receiving a user selection of a particular communication initiation control, and initiating communication through the communication mode associated with the particular communication initiation control.

In further detail, when the process 300 begins (301), a term that a user has entered into a text field is transmitted (302). The term may be transmitted, for example, to a server that may select contacts that match the term and may determine the capability and availability of the selected contacts.

For each of multiple communication modes, a communication initiation control and data that enables or disables the communication initiation control are received (303). For example, the communication initiation controls can be received as code that, when executed on a client device, causes the communication initiation controls to be presented on a user interface.

Data that enables or disables the communication initiation controls may include a value or signal that indicates which communication initiation controls should be enabled and which should be disabled. For example, a specific value (such as "enable" or "disable") may be provided for each of the communication initiation controls.

Data that enables or disables the communication initiation controls may include a list identifying selected contacts that match the term as well as information about the availability and capability of the selected contacts to communicate through each of multiple communication modes. Based on the list identifying the selected contacts and the capability and availability information, a client device may determine whether or not each communication initiation control should be enabled or disabled. For example, a communication initiation control may be enabled if at least one selected contact is available or is capable of communication through a particular communication mode. A communication initiation control may be disabled if none of the selected contacts is available or capable of communication through a particular communication mode.

A user selection of a particular communication initiation control is received (304). For example, a device may detect a button press, keystroke, or other input indicating selection of a communication initiation control.

Communication is initiated through the communication mode associated with the particular communication initiation control (305), thus ending the process 300 (306). For example, for a communication initiation control associated with telephone communication, a telephone call may be initiated. For a communication initiation control associated with text messaging, an area on the user interface to enter text for a text message may be presented.

Figure 4:
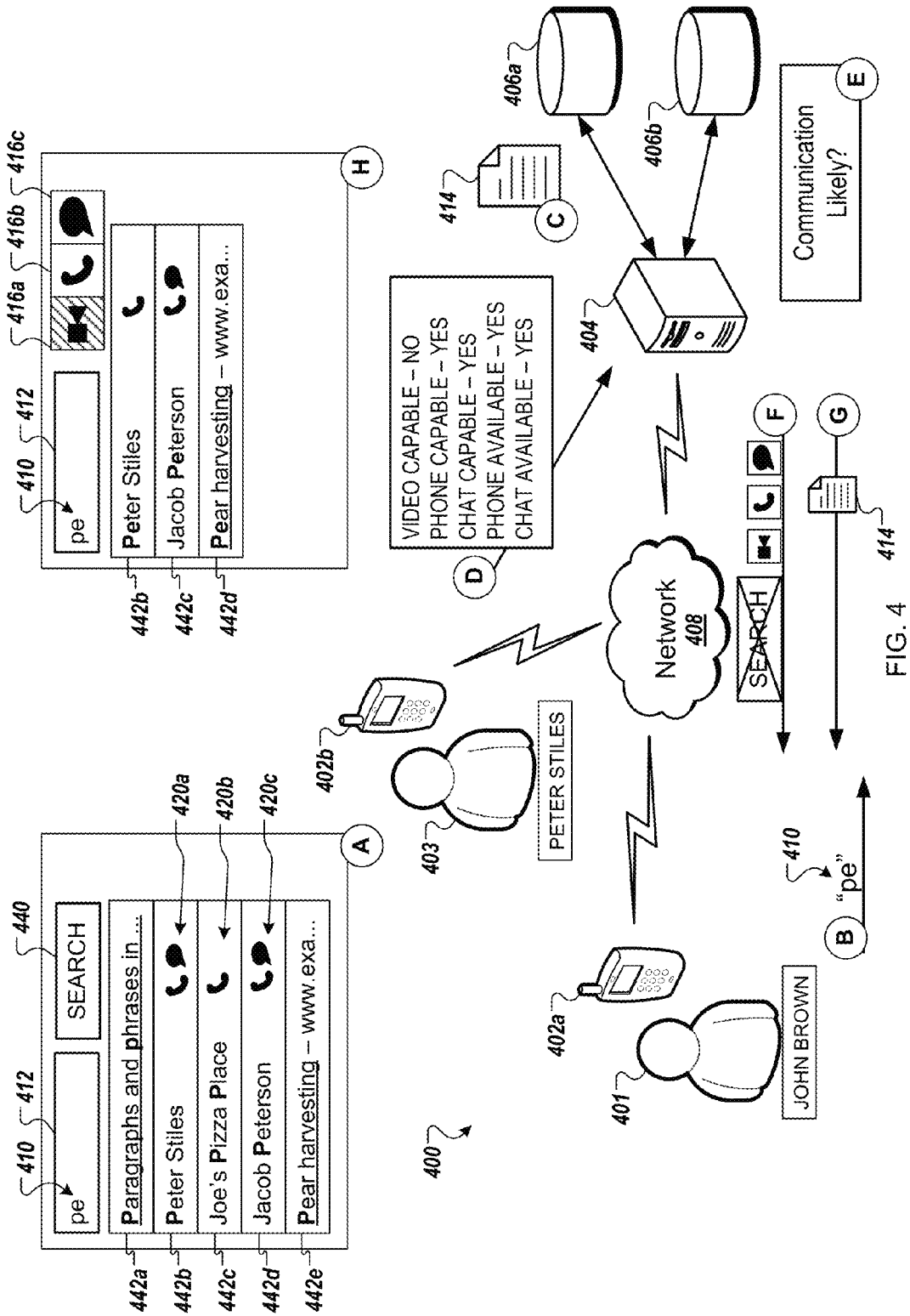

FIG. 4 is a diagram of an example of a system 400 for providing communication initiation controls. System 400 includes client devices 402a, 402b, a server 404, data sources 406a, 406b, a network 408, a flow of data, and user interfaces. The diagram shows states (A) to (H), which may or may not be illustrated in particular sequence.

During state (A), a user 401 enters a term 410 in a text field 412 on the user interface 407 of the client device 402a. Initially, the text field 412 included the letter "p," and list entries 442a-442e of results matching the term "p" are displayed on the user interface 407. The user 401 enters the character "e," which results in the term 410 having a value of "pe."

The list entries 442a-442e include entries for contacts (list entries 442b, 442c, 442d) and also list entries that do not represent contacts. In other words, not all of the list entries represent an entity that is capable of communication. For example, the highest ranked list entry 442a, "Paragraphs and phrases in . . . " shown at the top of the list, may be a link to a web page. The list entries 442a-442e that represent contacts may include status indicators 420a-420c that indicate the communication modes through which the contacts are available and capable of communicating.

Moreover, not every contact is required to be an individual. For example, list entry 442c for "Joe's Pizza Place" may represent a place of business. Nevertheless, a status indicator 420b may indicate that the business is available and is capable of communication through a particular communication mode, for example, by telephone.

Near the text field 412, a search control 440 is provided. The text field 412 may be associated with a search control 440, and the list entries 442a-442e may represent the results of a search query. A search query may be automatically initiated based on entering a term 110 in the text field 412. A search query may also be initiated by selecting the search control 440.

During state (B), the term 412 is transmitted from the client device 402a of the user 401 to the server 404. The server 404 receives the term "pe" that was entered in the text field 412.

During state (C), the server 404 selects contacts and other information based on the received term 410. The server 404 can select contacts and other information matching the term 410 from multiple data sources 406a, 406b, and the data sources may include different types of data. For instance, the server 404 may select contacts from the contacts list of user 401 and also select web pages from an index or other web resource. Selected contacts, documents, and other items can be identified in a selected items list 414. The selected items list may be ranked according to how well the selected items match the term 410.

In some implementations, contacts may be selected from a contacts list of the user 401 or another personal information source. Contacts may also be selected from a public information source, such as a directory or phone book.

In addition to selecting contacts, the server 404 may select web pages, files, applications, media, and other resources that match the term 410. Accordingly, a single text field 412 may allow a user 401 to access multiple types of information. For information that does not relate to contacts, the term 410 may be matched to the title, content, metadata, or other elements of a record.

During state (D), the server 404 receives information about the availability and capability of one or more selected contacts. Availability and capability data may be received from the client device 402b associated with a contact, from stored data, or from a system that determines availability and capability.

During state (E), the server 404 determines a likelihood that the user 401 will initiate communication. The server 404 can determine whether communication is likely based on the term 410 and the selected items identified in the selected items list 414. For example, the server 404 may determine that a high likelihood that the user 401 will initiate communication when the highest ranked item identified in the selected items list 414 is a contact.

During state (F), the server 404 transmits data to the client device 402a that causes communication initiation controls 416a-416c to be presented and also causes the search control 440 to be removed from the user interface 407. The server 404 may send the data directing that the communication initiation controls 416a-416c should be displayed in response to determining a high likelihood that the user 401 will initiate communication. Similarly, data indicating that the search control 440 should be removed from the user interface 407 may be transmitted based on determining the likelihood that the user 401 will initiate communication, for instance, based on determining that the user 101 is more likely to initiate communication than to initiate a search query.

During state (G), the selected items list 414 may be transmitted from the server 404 to the client device 402a. Each time a term 410 is changed, the set of selected items in the selected items list 414 may change. The server 404 may transmit the updated selected contacts list 414 each time the term 410 changes. Updated capability and availability information for contacts in the selected items list 414 may also be transmitted.

During state (H), the communication initiation controls 416a-416c are presented on the user interface 407 and the search control 440 has been removed. The selected items matching the term 410 are displayed as list entries 442b, 442d, 442e.

Each of the communication initiation controls 416a-416c is enabled or disabled based on the availability and capability of the contacts in the selected items list 414. In particular, each communication initiation control 416a-416c is enabled if at least one contact is available and is capable of communication through the associated communication mode. Each communication initiation control 416a-416c is disabled if none of the contacts are both available and capable of communication through the associated communication mode.

For example, because the contacts named "Peter Stiles" and "Jacob Peterson" are not capable of video communication, the communication initiation control 416a for video communication is disabled. On the other hand, because at least one contact in the selected items list 414, "Jacob Peterson," is available and capable of communication by online chat, the communication initiation control 416c for online chat is enabled. Similarly, because the selected contacts are available and capable of communication by telephone, the communication initiation control 416b for telephone communication is also enabled.

Figure 5:
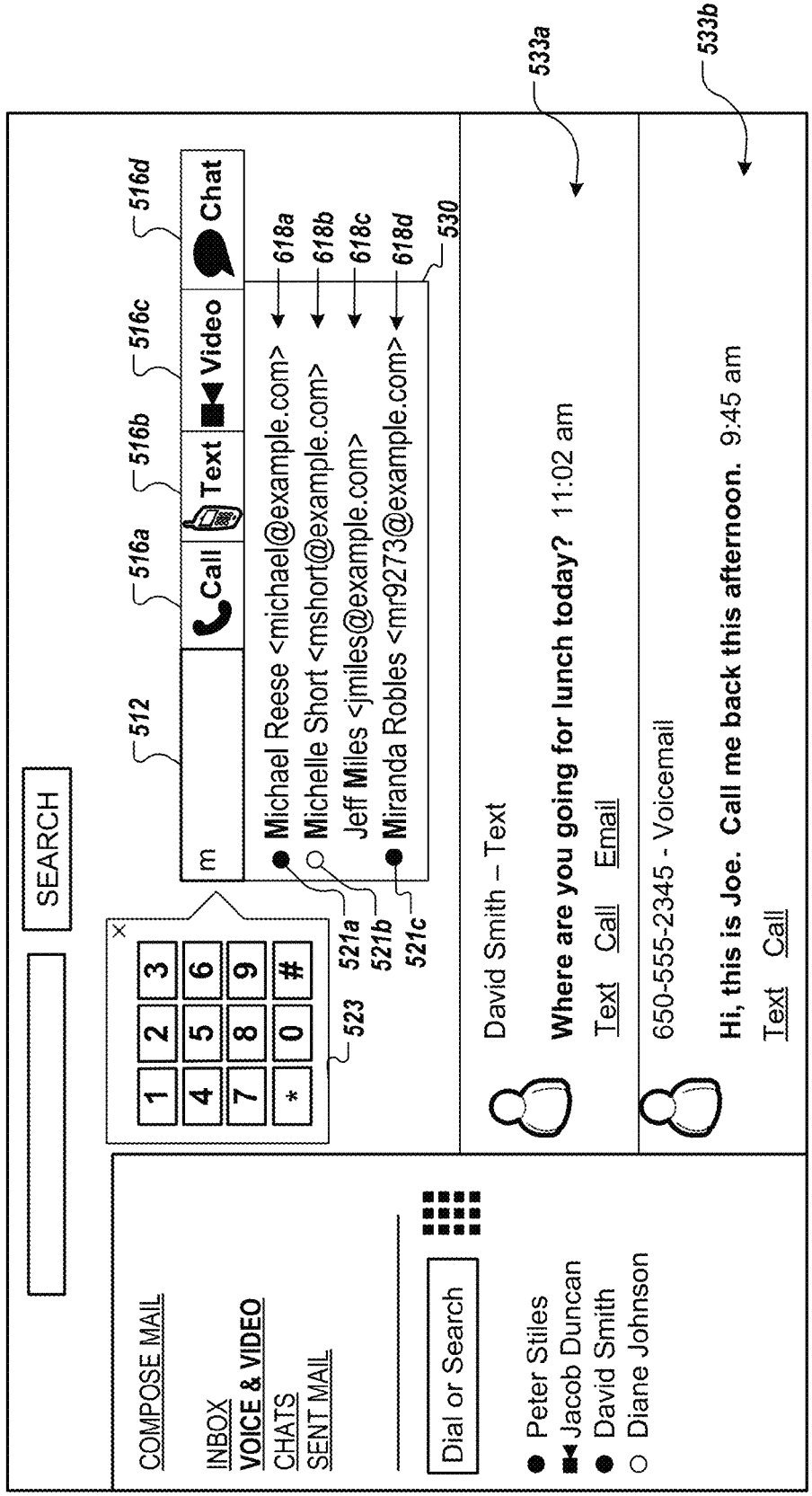
FIGS. 5, and 6A to 6E are diagrams illustrating examples of user interfaces.

FIG. 5 is a diagram illustrating an example of a user interface 500. The user interface 500 includes a term 510 entered in a text field 512 and a drop-down list 530 displaying contact entries 518a-518d. The user interface 500 also includes communication initiation controls 516a-516d, communication records 533a, 533b, status indicators 521a-521c, and an input area 523.

The contact entries 518a-518d can include contact identifiers to describe a contact that matches the term 510 in the text field 512. For example, the highest ranked contact entry 518a is for a contact named "Michael Reese" and the contact's e-mail address of "michael@example.com" is displayed. Other contact identifiers my also be displayed.

The contact entries 518a-518d can also include a status indicator 521a-521c that indicates the availability of a contact. For example, status indicator 521a (a filled-in circle) can indicate that the contact associated with the status indicator 521a, "Michael Reese" is available for communication. A symbol of a different shape or color may indicate that an associated contact is unavailable. For example, the status indicator 521b (an empty circle) may indicate that the contact associated with the status indicator 521b, "Michelle Short," is not available for communication. The status indicator 521b may also indicate that the associated contact is capable of communication but is not available at the current time. In addition, the absence of a status indicator 521a-521c, such as for contact entry 531c, may indicate that no contact information for the associated contact is known or that availability cannot be determined. Status indicators 521a-521c can include a variety of symbols to convey availability and capability information.

The input area 523 can facilitate input of text into the text field 512. For example, the input area 523 can include controls to facilitate the entry of numbers similar to a numeric keypad.

Near the text field 512, communication records 553a, 553b can be displayed. The communication records 553a, 553b can provide information about recent communications with a user or attempts to communicate with a user. For example, communication record 533a includes the contents of a text message received by a user. As another example, communication record 533b includes the contents of a voicemail. The communication records 553a, 553b can include information from communications and communication attempts over multiple communication modes.

Figure 6A:
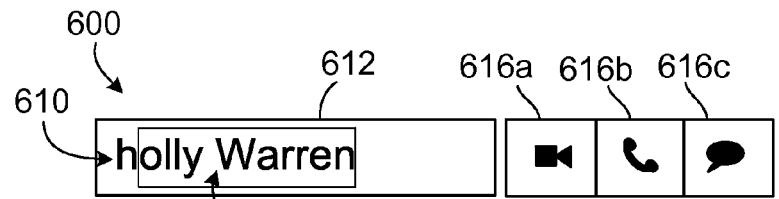

FIG. 6A is a diagram illustrating an example of a user interface 600. The user interface 600 includes a text field 612, communication initiation controls 616a-616c, a term 610, and additional text 650.

On the user interface 600, a text field 612 is presented with multiple communication initiation controls 616a-616c presented adjacent to the text field 612. The text field 612 is includes an auto-complete feature. As the term 610 is entered into the text field 612, a contact identifier for a contact is presented, as shown by the additional text 650. The additional text 650 may be highlighted, underlined, colored, or otherwise distinguished from the term 610.

In some implementations, a contact identifier for the highest ranking contact (for example the best matching contact from a list of selected contacts matching the term 610) is "filled in" as the additional text 650. When a user alters the term 610, and a different contact becomes the highest ranked, the additional text 650 is changed to include the remainder of the contact identifier for the new highest ranked contact. The additional text 650 may be presented in front of, behind, or surrounding the term 610. For example, for a term 610 of "Wa" for which the highest ranking contact has a name of "Holly Warren," the additional text may include segments of "Holly" and "rren" presented around the term 610. Multiple contact identifiers and/or contact identifiers other than names can also be auto-completed and presented in the additional text 650.

The communication initiation controls 616a-616c may be presented at a defined location relative to each other and to the text field 612. For example, the communication initiation controls 616a-616c may be presented to one side of the text field 612 featuring auto-complete capabilities. This configuration can provide a functional interface to the user in a very small screen height.

The communication initiation controls 616a-616c can be continually present on the user interface 600 or can be presented in response to determining that a contact or contact identifier is the highest ranking result of a query or implicit search based on the term 610. The communication initiation controls 616a-616c may be presented dynamically and may replace or obscure one or more other controls.

The communication initiation controls 616a-616c may be enabled and disabled to reflect the availability and capability of one contact or multiple contacts. The text field 612 may also include contact identifiers of multiple contacts, such as by presenting the term 610 multiple times with multiple sections of additional text 650. As an example, for a term of "h", the text field 612 may be populated to include "holly Warren, hannah Childers, Sally hughes" showing contact identifiers for multiple contacts. Each communication initiation control 616a-616c can be enabled if at least one contact in the set is available and capable of communication through the associated communication mode or disabled if none of the contacts in the set are available and capable to communication through the associated communication mode. To conserve space on the user interface 600, the user may be required to scroll vertically or horizontally to view multiple contact identifiers in the text field. Additionally or alternatively, a short contact identifier (such as a nickname, username, first name, title and surname, etc.) can be used to fit additional identifiers in a limited space.

Figure 6B:
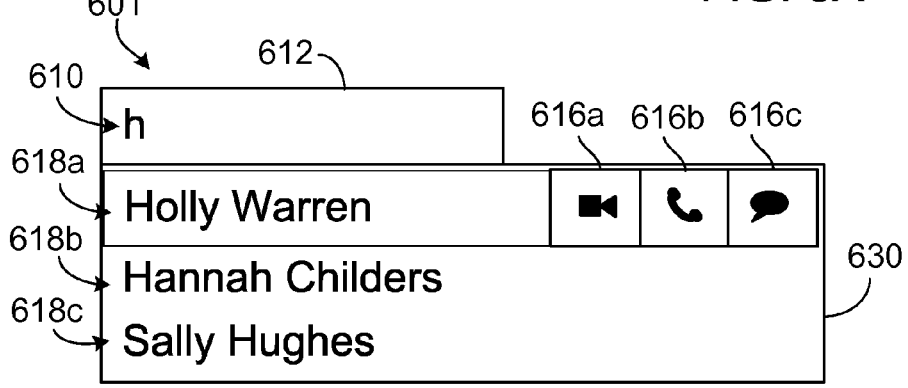

FIG. 6B is a diagram illustrating an example of a user interface 601. User interface 601 includes a text field 612, communication initiation controls 616a-616c, a term 610, a drop-down list 630, and contact entries 618a-618c.

On user interface 601, the drop-down list 630 is presented below the text field 612. The drop-down list 630 may be hidden until the term 610 is entered. Once the term 610 is entered by a user, the drop-down list 630 may be populated with one or more contact identifiers for contacts matching the term 610 and the drop-down list 630 may be presented on the user interface 601. For example, the drop-down list 630 includes contact entries 618a-618c, with each contact entry 618a-618c representing a different contact. One or more contact identifiers can be displayed for each contact in the each contact entry 618a-618c. To display the contact entries 618a-618c, the drop-down list 630 may expand under the text field 612 and may cover or obscure other visual elements.

Within the boundaries of the drop-down list 630, the communication initiation controls 616a-616c can be presented next to one or more contact identifiers. For example, the communication initiation controls 616a-616c may be presented in or on a contact entry 618a for the highest ranking contact. The contact entry 618a for the highest ranking contact can be highlighted, selected, or otherwise distinguished from the other contact entries 618b, 618c. The communication initiation controls 616a-616c can be based on the capability and availability of multiple contacts, such as some or all of the contacts having a contact entry 618a-618c in the drop-down list 630.

Figure 6C:
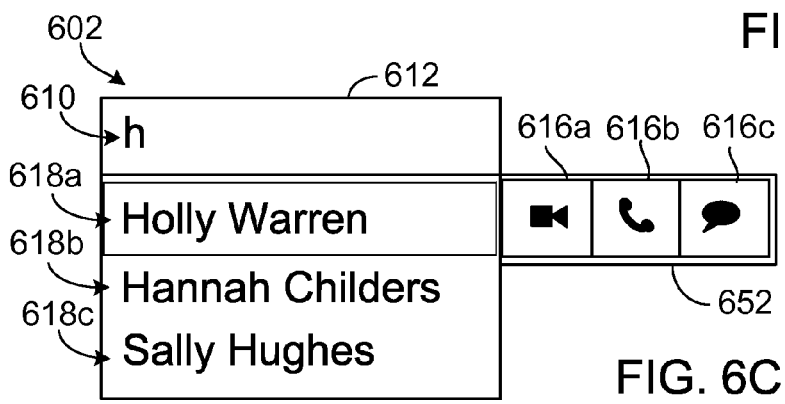

FIG. 6C is a diagram illustrating an example of a user interface 602. User interface 602 includes a text field 612, communication initiation controls 616a-616c, a term 610, a drop-down list 630, and contact entries 618a-618c.

User interface 602 includes features similar to those described in user interface 601 above. Instead of the communication initiation controls 616a-616c being provided on the contact entry 618a within the drop-down list 630, however, the communication initiation controls 616a-616c are provided on a flyout menu 652 associated with the contact entry 618a. The flyout menu 652 may be provided automatically when contact entries 618a-618c are populated in the drop-down list 630 or may appear only after a user moves a cursor over the contact entry 618a, presses a key, or enters other input. The flyout menu 652 may cover, obscure, replace, displace, or otherwise modify the display of nearby visual elements. The drop-down list 630 may have the same width as the text field 612.

The flyout menu 652 may be presented adjacent to one or more contact entries 618a-618c, and the flyout menu 652 may be nearby, next to, or inline with one or more contact entries 618a-618c. The edges of the flyout menu 652 and the drop-down list 630 may touch, but are not required to. In some implementations, the flyout menu 652 may be docked to a screen location, toolbar, or a portion of the user interface 602. The flyout menu 652 may be positionable by the user, and may display consistently at a user-selected area.

Figure 6D:
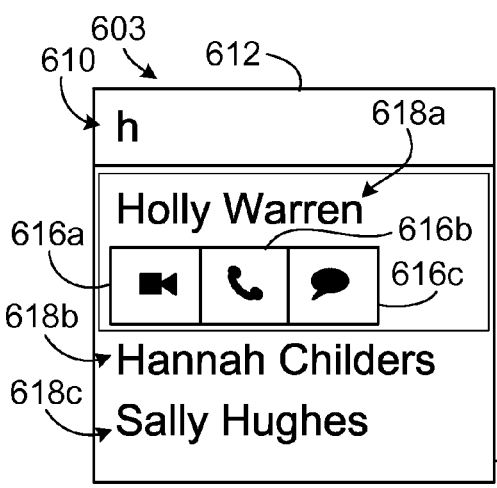

FIG. 6D is a diagram illustrating an example of a user interface 603. User interface 603 includes a text field 612, communication initiation controls 616a-616c, a term 610, a drop-down list 630, and contact entries 618a-618c.

On user interface 603, the communication initiation controls 616a-616c are presented on or in a contact entry 618a, such as the contact entry for the highest ranking contact. The communication initiation controls 616a-616c can be presented under or above one or more contact identifiers or at another location within a space defined for the contact entry 618a. The space defined for the contact entry 618a with which the communication initiation controls 616a-616c are presented can be greater than the space defined for other contact entries 618b, 618c. This configuration can emphasize the contact identifier for the highest ranking contact and can maintain a consistent width for the text field 612 and the drop-down list 630.

Figure 6E:
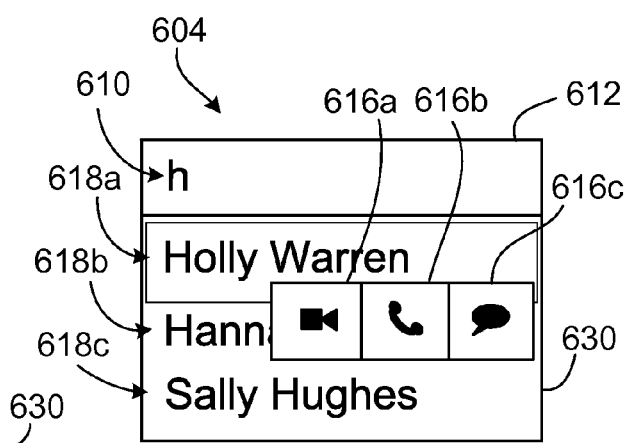

FIG. 6E is a diagram illustrating an example of a user interface 604. User interface 604 includes a text field 612, communication initiation controls 616a-616c, a term 610, a drop-down list 630, and contact entries 618a-618c.

The communication initiation controls 616a-616c are floating controls that can be presented over the drop-down list 630, contact entries 618a-618c, and other visual elements. One or more contact entries 618a-618c may be partially or fully obscured by the communication initiation controls 616a-616c. The communication initiation controls 616a-616c may be positionable by the user on the user interface 604 and off the user interface 604 to other display areas.

In each case that a drop-down list is described or illustrated, the same list may be presented above a text field or to either side of a text field. The term "drop-down list" is used to refer to a visual element that can occupy or dynamically expand into a space near the text field and can include entries for contact identifiers.

A number of implementations have been described. Nevertheless, it will be understood that various modifications may be made without departing from the spirit and scope of the disclosure. For example, various forms of the flows shown above may be used, with steps re-ordered, added, or removed.

Embodiments and all of the functional operations described in this specification can be implemented in digital electronic circuitry, or in computer software, firmware, or hardware, including the structures disclosed in this specification and their structural equivalents, or in combinations of one or more of them. Embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments have been described. Other embodiments are within the scope of the following claims. For example, the steps recited in the claims can be performed in a different order and still achieve desirable results.

What is claimed is:

1. A computer-implemented method comprising:
   receiving a term;
   in response to receiving the term, selecting (i) one or more contacts matching the term and (ii) one or more items matching the term that are not contacts, wherein the one or more items that are not contacts include one or more web documents matching the term;
   providing data identifying the one or more contacts and the one or more items that are not contacts; and
   before receiving an indication that a user has selected from among the one or more contacts and the one or more items:
   selecting a subset of the contacts which are designated as currently able to communicate; and
   providing, for display, status indicators corresponding to the contacts in the subset which are designated as currently able to communicate.

2. The computer-implemented method of claim 1, wherein providing, for display, status indicators corresponding to the contacts in the subset comprises providing, after receiving the term and before receiving an indication that a user has selected from among the one or more contacts matching the term, status indicators indicating multiple communication modes through which the contacts in the subset are currently available to communicate.

3. The computer-implemented method of claim 2, wherein providing entries for a list of search results that includes the one or more contacts and the one or more items that are not contacts comprises providing the entries corresponding to the one or more contacts and the one or more items that are not contacts for display in a drop-down list.

4. The computer-implemented method of claim 2, wherein each of the entries includes an identifier for one of the one or more contacts; and
   wherein providing, for display, status indicators corresponding to the contacts in the subset comprises providing the status indicators for display adjacent to the identifiers for contacts in the subset.

5. The computer-implemented method of claim 2, wherein selecting (i) the one or more contacts matching the term and (ii) the one or more items matching the term that are not contacts comprises:
   selecting one or more contacts having an identifier that begins with the term; and
   selecting one or more items that are not contacts and that have an identifier that begins with the term.

6. The computer-implemented method of claim 1, wherein providing, for display, status indicators corresponding to the contacts in the subset comprises providing, for display with data identifying the contacts in the subset, communication initiation controls corresponding to different communication modes through which one or more of the contacts in the subset are designated as currently able to communicate, each communication initiation control being configured to initiate communication through the corresponding communication mode in response to interaction by a user.

7. The computer-implemented method of claim 1, wherein providing data identifying the one or more contacts and the one or more items that are not contacts comprises providing entries in a list of search results including the one or more contacts and the one or more items that are not contacts.

8. The computer-implemented method of claim 1, further comprising providing data indicating a ranking of the one or more contacts and the one or more items.

9. The computer-implemented method of claim 1, further comprising:
   determining a ranking of the one or more contacts and the one or more items based on how well the one or more contacts and the one or more items match the term; and
   providing data indicating the ranking of the one or more contacts and the one or more items, the one or more contacts and the one or more items being ranked together for display in a single list.

10. The computer-implemented method of claim 1, wherein providing data identifying the one or more contacts and the one or more items that are not contacts comprises providing, for display at a client device, a list that includes both (i) names of people selected as contacts matching the term and (ii) links to web documents matching the term.

11. The computer-implemented method of claim 1, wherein the selected one or more items matching the term that are not contacts include one or more of an application matching the term, a file matching the term, and a media item matching the term.

12. The computer-implemented method of claim 1, wherein selecting the one or more items matching the term that are not contacts comprises selecting items that do not represent entities capable of communication.

13. The computer-implemented method of claim 1, wherein the one or more contacts include contacts selected from a list of social networking connections.

14. A computer-implemented method comprising:
transmitting a term;
receiving data identifying (i) one or more contacts matching the term and (ii) one or more items matching the term that are not contacts, wherein the one or more items that are not contacts include one or more web documents matching the term;
displaying, on a user interface, the data identifying the one or more contacts matching the term and the one or more items matching the term that are not contacts;
receiving data indicating a subset of the contacts which are designated as currently able to communicate; and
before receiving an indication that a user has selected from among the one or more contacts and the one or more items, displaying status indicators corresponding to the contacts in the subset which are designated as currently able to communicate.

15. A computer storage medium encoded with a computer program, the program comprising instructions that when executed by one or more computers cause the one or more computers to perform operations comprising:
receiving a term;
in response to receiving the term, selecting (i) one or more contacts matching the term and (ii) one or more items matching the term that are not contacts, wherein the one or more items that are not contacts include one or more web documents matching the term;
providing data identifying the one or more contacts and the one or more items that are not contacts; and
before receiving an indication that a user has selected from among the one or more contacts and the one or more items:
selecting a subset of the contacts which are designated as currently able to communicate; and
providing, for display, status indicators corresponding to the contacts in the subset which are designated as currently able to communicate.

16. The computer storage medium of claim 15, wherein providing, for display, status indicators corresponding to the contacts in the subset comprises providing, after receiving the term and before receiving an indication that a user has selected from among the one or more contacts matching the term, status indicators indicating multiple communication modes through which the contacts in the subset are currently available to communicate.

17. The computer storage medium of claim 15, further comprising providing data indicating a ranking of the one or more contacts and the one or more items.

18. The computer storage medium of claim 15, wherein providing data identifying the one or more contacts and the one or more items that are not contacts comprises providing, for display at a client device, a list that includes both (i) names of people selected as contacts matching the term and (ii) links to web documents matching the term.

19. A system comprising:
one or more computers; and
a computer-readable medium coupled to the one or more computers having instructions stored thereon which, when executed by the one or more computers, cause the one or more computers to perform operations comprising:
receiving a term;
in response to receiving the term, selecting (i) one or more contacts matching the term and (ii) one or more items matching the term that are not contacts, wherein the one or more items that are not contacts include one or more electronic resources matching the term;
providing data identifying the one or more contacts and the one or more items that are not contacts; and
before receiving an indication that a user has selected from among the one or more contacts and the one or more items:
selecting a subset of the contacts which are designated as currently able to communicate; and
providing, for display, status indicators corresponding to the contacts in the subset which are designated as currently able to communicate.

20. The system of claim 19, wherein providing, for display, status indicators corresponding to the contacts in the subset comprises providing, after receiving the term and before receiving an indication that a user has selected from among the one or more contacts matching the term, status indicators indicating multiple communication modes through which the contacts in the subset are currently available to communicate.

21. The system of claim 19, wherein providing, for display, status indicators corresponding to the contacts in the subset comprises providing, for display with data identifying the contacts in the subset, communication initiation controls corresponding to different communication modes through which one or more of the contacts in the subset are designated as currently able to communicate, each communication initiation control being configured to initiate communication through the corresponding communication mode in response to interaction by a user.

22. The system of claim 19, further comprising providing data indicating a ranking of the one or more contacts and the one or more items.

23. The system of claim 19, wherein providing data identifying the one or more contacts and the one or more items that are not contacts comprises providing, for display at a client device, a list that includes both (i) names of people selected as contacts matching the term and (ii) links to selected web documents matching the term.

24. The system of claim 19, wherein the one or more items matching the term that are not contacts include one or more of an application matching the term, a file matching the term, and a media item matching the term.

\* \* \* \* \*